United States Patent Office 3,538,722
Patented Nov. 10, 1970

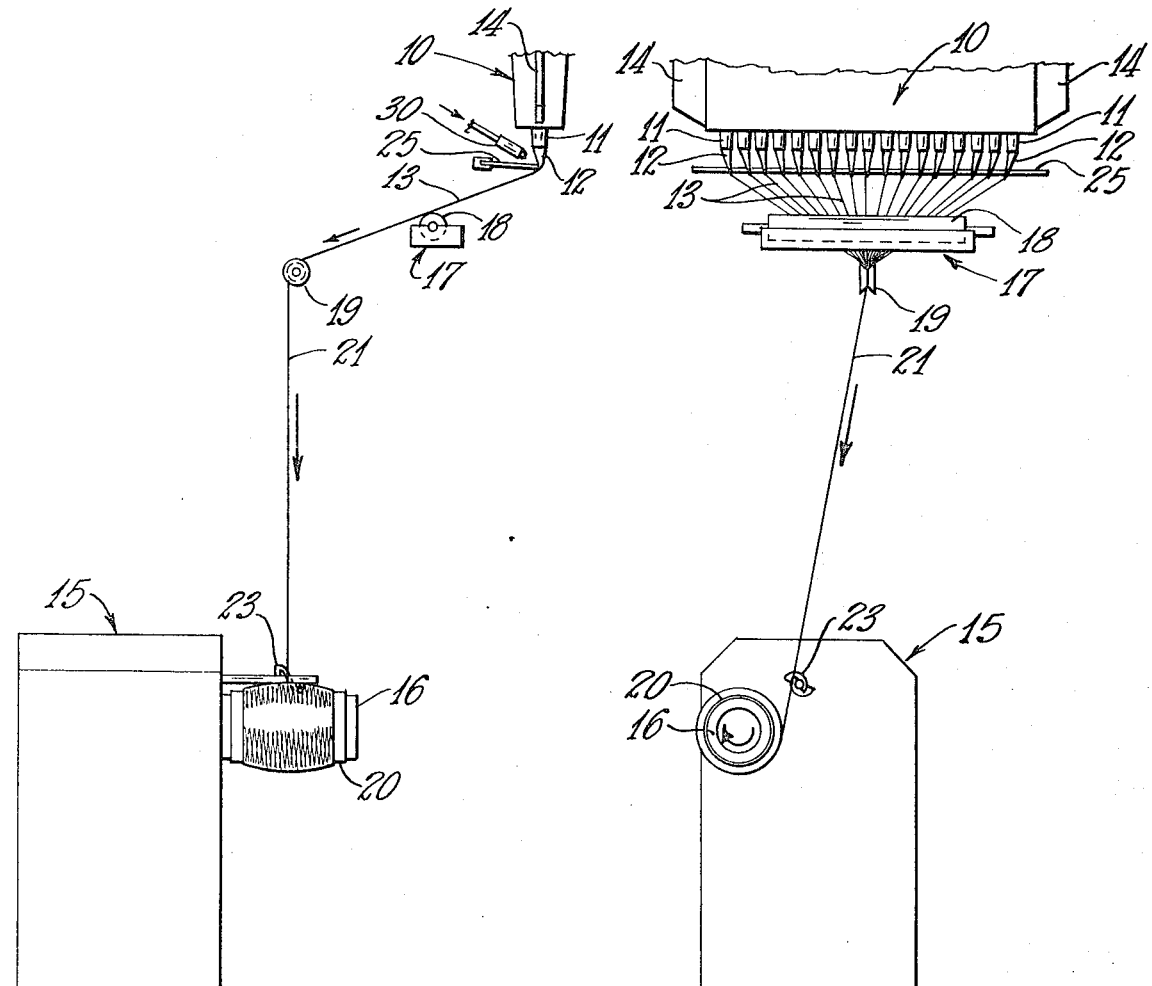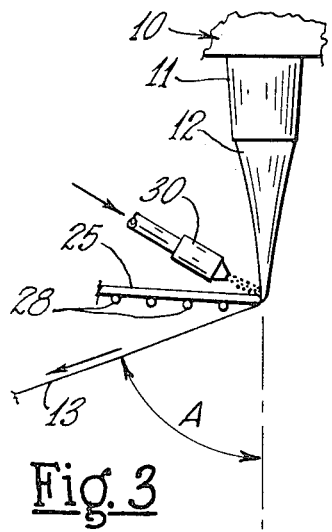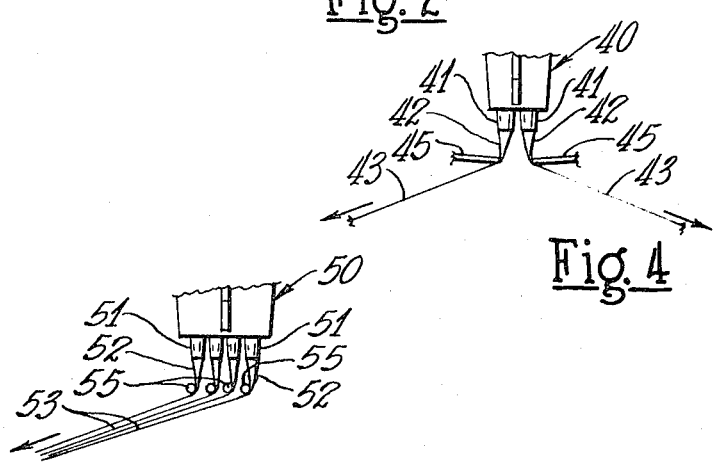

3,538,722
METHOD FOR PRODUCING CURLY GLASS FIBERS
Ralph M. Stream, Newark, Ohio, assignor to Owens-Corning Fiberglas Corporation, a corporation of Delaware
Filed Mar. 27, 1967, Ser. No. 626,301
Int. Cl. C03b 37/02
U.S. Cl. 65—2      4 Claims

ABSTRACT OF THE DISCLOSURE

The method and apparatus for forming continuously curled fine fibers from streams of flowable material such as molten glass where attenuating the streams forms a cone thereof diminishing in size to an apex region and the path of the stream is changed in the apex region to form a fiber having one side longer than the opposite side.

BACKGROUND OF THE INVENTION

It has been known in the prior art that glass in fiber form can be rendered curly solely through differential chilling. One side of a glass fiber is cooled faster than the opposite side such as passing the one side through cold water while the other is exposed to the atmosphere. Moreover, differential cooling or chilling can be accomplished by passing one side of the glass fiber across a chilled surface. The side of the fiber which is more rapidly cooled assumes the concave side.

Differential chilling is limited in its use. While it is effective in the curling of glass fibers of relatively large diameter in the order of .004 inch or more in diameter, it is not effective on small diameter glass fibers, particularly glass fibers in the range of from .0002 inch to .00015 inch or less. A temperature difference between two sides of such small diameter fibers is practically impossible to obtain. This means that little or no curl to the glass fiber ensues. Differential chilling is further limited in the extent to which the glass fibers may be curled or provided with a curl because of practical limitations of control over the degree of difference in the rate of chilling to opposite sides of the glass.

Prior art such as U.S. Pat. 2,708,813 discloses bending an already formed glass fiber about a curved and cooled surface to produce a curled fiber. While a complementary mechanical shaping action to the already formed glass fiber is disclosed, the thrust of the prior art is directed towards curling an already formed fiber by asymmetrical or differential cooling. A cooling element having a curved surface is disposed a spaced distance from a spinerette and the already formed fiber is drawn to pass across and slightly bend upon the surface as it is drawn to a collection position.

The asymmetrical cooling in combination with the complementary mechanical shaping action disclosed in U.S. Pat. 2,708,813 has limited applicaton. As mentioned differential chilling of small diameter or fine glass fibers is extremely difficult to obtain and control. Moreover, even with the complementary mechanical shaping, a curl is practically impossible to obtain in a formed fiber, particularly in the .00015 inch fiber diameter range.

Prior art such as U.S. Pat. 2,919,534 discloses edge-crimping of thermoplastic yarn. Here the multifilament thermoplastic yarn, particularly organic yarn, is heated as it is pulled about a crimping edge to stretch the portion of the yarn farthest from the edge and compress the portion adjacent to the edge, thereby imparting a curl.

Edge crimping is not suitable for curling of glass fibers. One reason is the high heat required to bring a glass fiber to a heat setting or plastic condition. Because of the high temperature needed for glass, the process would be very slow and an effective curl would not be obtained.

SUMMARY OF THE INVENTION

In view of the foregoing, it is an object of the present invention to provide a novel method and apparatus for continuously forming curled glass fibers for substantially the full range of glass fiber diameters, especially fine fibers in the range of from .0002 to .00015 or less.

It is another object of the invention to provide a method and apparatus for forming curly continuous glass fibers controllable in the degree of tightness of curl imparted to the fibers.

It is still another object of the invention to provide a method and apparatus for forming permanently curled continuous glass fibers that are especially adapted to continuous high speed glass forming operations.

These and other objects are attained by imparting curl to the fibers as they are forming from the individual streams of flowable material such as molten glass. As the fibers are formed, the individual streams are attenuated into substantially cone-shaped configurations diminishing in size to an apex region. The path of each of the streams is changed in the apex region such as by bending the apex region upon a surface to form fibers with the portion thereof contacting the surface having a shorter length dimension than its opposite portion, i.e. one side having a longer length dimension than the opposite side. Because the rudimentary fibers of the apex region are sufficiently formed, the curl imparted to them by the difference in lengths is preserved as they are withdrawn from their respective apex regions.

A feature of the invention provides a lubricant to the fiber curling zone, especially to the surface of a curling member, to reduce fiber break-outs during fiber formation as the streams are bent over the surface of the member.

DESCRIPTION OF THE DRAWINGS

Other objects and advantages of the invention will become apparent as the invention is hereinafter described in more detail with reference made to the accompanying drawings in which:

FIG. 1 is a diagrammatic front elevation view of an assemblage embodying the principles of the invention for continuous glass fibers from individual molten streams and subsequently gathered into a strand;

FIG. 2 is a side elevation view of the apparatus shown in FIG. 1;

FIG. 3 is an enlarged side elevation view of the glass feeder tip section of the apparatus illustrated in FIG. 1 where the generally cone-shaped streams of molten glass from which the glass fibers are formed are shown with an arcuate surface disposed at the apex region of the cone for forming curly fibers as the rudimentary glass fibers are formed and further illustrates means for directing a lubricating mist towards the surface of the curling member;

FIG. 4 is a side elevation view of a modified fiber curling unit adapted to form curled glass fibers according to the principles of the invention;

FIG. 5 is a side elevation view of still another fiber curling unit for forming curled glass fibers according to the principles of the invention.

DESCRIPTION OF THE PREFERRED EMBODIMENTS

While the method and apparatus of the invention are disclosed with regard to the forming of curled glass fibers, the invention may be employed with other flowable materials such as heat-softenable materials.

Referring to the drawings in greater detail, FIGS. 1 and 2 show an assembly of apparatus for continuously forming curly continuous glass fibers according to the principles of the invention including a source of molten glass comprising a melting container and feeder 10. The feeder 10 is made of heat resistant and high-heat conducting materials such as platinum. A plurality of vertical and downwardly extending orificed projections or tube-like members 11 are on the bottom side of the feeder 10. The members 11 communicate with the interior of the feeder 10 and provide a means through which molten glass in the form of a plurality of molten glass streams 12 are supplied for attenuation into continuous fibers 13. The members 11 are normally made of the same material as the feeder 10. For ease of operation, the members 11 as illustrated in FIGS. 1 and 2 are aligned in a straight row along the bottom of the feeder 10.

The feeder 10 is provided with terminals 14 at its ends across which electrical potential is applied to supply a current of magnitude sufficient to heat it to a desired glass attenuating temperature.

The attenuating force for pulling and withdrawing the fibers 13 from the molten streams 12 is provided by any suitable winding apparatus such as the illustrated collet-type winder 15 disposed below the feeder 10.

At a spaced distance below the feeder 10 the fibers 13 are pulled by a suitably rotated horizontally extending mandrel or collet 16 on the winder 15 across a size applicator 17 and gathering shoe 19 on their journey to a collection or packaging tube 20 suitably supported on and rotated by the collet 16 of the winder 15. The size applicator 17 supplies sizing fluid to the fibers 13 by means of a roll 18 appropriately supported to rotate through the sizing fluid and present the fluid to the traveling fibers 13 passing across it, the sizing fluid is supplied from an external source, not shown. The gathering shoe 19 is shown in FIGS. 1 and 2 disposed in spaced apart relationship and somewhat below the applicator 17. The gathering shoe 19 brings the fibers 13 together into a strand 21 and is a turning surface. The shoe 19 may be a rotating member.

The strand 21 is wound on the rotating collection or packaging tube 20. A suitably traversing means such as a conventional spiral wire traverse 23 is associated with the winder 15 and engages the strand 21 to reciprocate it across the length of the packaging tube 20 to build packages of desired form.

As is clearly illustrated in FIGS. 1 through 3, the fibers 13 are formed from streams of molten glass 12 that are attenuated into substantially cone-shaped configurations. Each of the streams 12 extends with diminishing size to an apex region at its associated fiber. The fibers 13 emerge at the apex region.

A curling member presenting a surface such as a flat longitudinal member 25 having an arcuate edge is positioned exceedingly close to and somewhat below the members 11. As shown in FIGS. 1-3, the member 25 is disposed to present a horizontally extending arcuate edge contacting the glass in the apex region of the molten streams 12.

The path of the apex region of each of the molten streams 12 is altered or changed by bending each apex region upon the edge of the member 25. In the arrangement shown in FIGS. 1 and 2, the change in the path of glass in each apex region is accomplished by withdrawing the fibers 13 across the applicator roll 18 to turn on the gathering shoe 19, which is located below and laterally offset from the members 11. Each of the apex regions is pulled by a fiber 13 to bend upon the edge of the member 25.

The streams of molten glass 12 are usually very small. FIG. 3 illustrates an enlarged side elevation view of a glass feeder tube-like member 11 having one of the molten glass streams 12 flowing therefrom that is drawn into a substantially cone-shaped configuration from which the fiber 13 is formed. The height of each of the cone-shaped streams 12 usually ranges from $\frac{1}{16}$ of an inch to $\frac{3}{4}$ of an inch for larger diameter fibers and from $\frac{1}{64}$ of an inch to $\frac{1}{32}$ of an inch for smaller diameter fibers in the fiber diameter range of from .0002 inch to .00015 inch.

Because the temperature of the glass in the streams 12 varies as the glass extends further from the outlet of the tube-like members 11, the consistency of the glass in the stream also varies. The glass is more flowable and fluid at its higher temperatures at the outlet of the members 11 and tends toward a more solid state at the apex region where the temperature is less. While the temperature of the molten glass exiting the members 11 depends upon variables such as the composition of the molten glass and fiber diameter being produced, the temperature of the glass stream as it emerges from the members 11 is generally in the range of from 2200 degrees Fahrenheit to 2400 degrees Fahrenheit or higher. This high glass temperature immediately begins dropping to where the temperature of the glass at the apex region is in the general range of from 800 to 1400 degrees Fahrenheit.

Because it is according to the principles of the invention to form curled fibers from the streams of molten glass 12, the location of the member 25 in relation to the molten streams 12 is most important. While the consistency of the molten glass does not appear to change abruptly along the height of the streams 12, it has been determined that the consistency of the molten glass in the apex region of each of the streams 12 and the development of the formation of the fibers 13 are such as to permit forming curled fibers. If the member 25 is located too close to the outlets of the tube-like members 11 at the larger end of the streams 12, the consistency of the molten glass is too fluid to establish curled fibers, and in fact, it would appear that not even a rudimentary fiber has been formed at such location. If the member 25 is located with its edge beyond the apex region of the streams 12, the fibers are already formed and the more solid state or consistency of the glass does not permit imparting a satisfactory curl to the fibers as by bending. The member 25 must be located with its edge contacting the height of each of the streams 12 where the stage of fiber formation has progressed enough for the consistency of the molten glass to respond to the bending or change in the direction of the path of the glass upon the surface or edge of the member 25 to give curl to the fibers 13 by forming them with the side contacting the edge of the member 25 having a shorter length dimension than their opposite side. This locaiton is the apex region. Further, if the edge of the member 25 is positioned to contact the streams 12 somewhat above the apex region, an initial curl given to the fibers may be pulled from them, straight fibers being the result.

While the apex region of the individual streams 12 is located substantially at the smaller end of the streams, it does not have a set length dimension. The length of the region may vary according to such things as forming conditions, glass compositions and fiber size (diameter). FIG. 3 shows the edge of the member 25 contacting the stream 12 in the apex region. The member may be moved vertiaclly somewhat and still attain a curled fiber. In practice some movement of the member 25 may be required to obtain optimum results.

The curl imparted to the fibers 13 during their formation cannot be seen during the fiber collection and packaging process because the curl imparted to the fibers 13 are overcome by the processing tensions along the fiber. The curl remains and the fibers are brought into a curly state when the strand 21 is allowed to relax.

While the curling member 25 is shown as a longitudinal member having an arcuate edge, any suitable member providing a bending surface may be employed such as a rod. Moreover, members having substantially a knife edge or corner may be employed. Good results have been obtained using a member having an arcuate surface with a radius of curvature of from $\frac{1}{64}$ of an inch to $\frac{1}{8}$ of an inch. Further, members providing an angular surface such as a multiplanar surface can be used.

Because the member 25 is located in close proximity to the high temperatures of the feeder 10, member 25 is normally made of high heat resistant material compatible with glass. Graphite has been found to be the most useful material. Metal members having a graphite coating have been employed with some success. A material presenting a rough surface cannot be used with advantage because the glass passing across the curling member 25 is nascent and unprotected and may be severely damaged by abrasive action.

While the member 25 may be water cooled such as by means of passing cooling water through tubes 28 that are suitably associated with the member 25 as shown in FIG. 3, it does not appear that cooling is particularly helpful in imparting curl to fine glass fibers, although it may have utility in coarser fibers.

The diverging path of the fibers 13 from the direction of glass flow in the fiber-forming cone 12 is preferably substantial as the glass in the apex region is bent on the edge of the member 25. This angle is shown as A in FIG. 3 and in practice is from 20 to 75 degrees or more. Excellent curly fibers have been obtained using 75 degrees. Of course, the greater the angle the more pronounced and tight is the curl imparted to the fibers 13.

It has been determined that the fiber curling apparatus and process of the invention operate with very few fiber break outs when lubrication, particularly lubrication in the form of an oil mist, is applied to the zone where the molten glass passes over the edge of the curling member 25. This is true even when the curling member 25 is fabricated of graphite. Lubricants such as those containing highly purified molybdenum disulfide powder sold under the trademark Molykote and silicones may be useful. In practice it has been determined that an atomized mist of 10–20 weight motor oil provided to the curling zone, viz the edge of the member 25, through a suitable nozzle 30 gives excellent results. An oil source (not shown) supplies the oil to the atomizing nozzle 30 through suitable fluid carrying means.

In operation the curled fibers 13 are formed from individual streams of molten glass 12. The streams 12 are attenuated into cone-shaped configurations diminishing in size to an apex region where the fibers 13 are formed. The path of the glass in the apex region of each of the streams 12 is changed as by bending on the member 25. The fibers withdrawn from the surface of the member 25, i.e., the edge, are formed with one side longer than the opposite side and are passed across the applicator 17 to the gathering shoe 19, thence vertically downwardly to the collection position. The linear speed of the fibers 13 may range from several thousand feet per minute to 10,000 feet per minute or more.

The apparatus may include a suitable arrangement to vary angle A to manufacture curly fibers having more or less curl. This may be accomplished by providing means to vary the position of either the applicator 17 or the gathering shoe 19 or both. As an example, in the latter arrangement, one may move both the applicator 17 and shoe 19 vertically to increase or decrease the angle A. In such a manner angle A can be changed to vary the amount of curl imparted in the fibers 13.

FIG. 4 illustrates a modification to the apparatus shown in FIGS. 1–3 that provides means to impart curl constantly to continuous glass fibers attenuated from more than one row of tips. Molten glass in a feeder 40 is supplied through tubular members 41 as molten streams 42 that are attenuated into glass fibers 43. The members 41 are disposed as two adjacent and parallel extending rows. Curling members 45 are provided for each molten stream 42 in each row and the fibers 43 are attenuated outwardly and somewhat downwardly on opposite sides of the feeder 40 to curl the fibers in opposite directions according to the principles of the invention.

FIG. 5 shows still another modification of the invention that provides means to uninterruptedly impart curl to continuous glass fibers. Molten glass in a feeder 50 is supplied through tubular members 51 as molten streams 52. The members 51 are positioned as a plurality of rows extending parallel to each other. Curling members 55, in this instance rods, extend along the length of the individual rows of the tubular members 51 for altering the path of the molten glass according to the principles of the invention. As illustrated, the fibers 53 are withdrawn on the same side of the feeder 50, each fiber being withdrawn from the curling member 55 substantially at the same angle. Some of the fibers 53 may be drawn off on opposite sides of the feeder 50 similar to the manner illustrated in FIG. 4.

While the invention has been discussed in connection with a member upon which the apex region of the individual molten streams may be bent, any suitable means for changing the path of the material in the apex region such as blasts of directed air may be employed.

It is apparent that modifications and different arrangements may be made within the scope of the invention other than as herein disclosed. The present disclosure is merely illustrative, the invention comprehending all variations thereof.

I claim:
1. The method of forming a continuously curled fine fiber from a source of heat softened glass comprising the steps of:
drawing said heat softened glass into a cone-shaped form diminishing in size to an emerging fiber at an apex region;
changing direction of said emerging fiber in said apex region an amount sufficient to impart a longer length dimension to one side of said emerging fiber than the opposite side; and
withdrawing said fiber from said apex region.
2. The method of forming a continuously curled fine fiber from a stream of molten glass comprising the steps of:
drawing said stream into a cone-shaped form diminishing in size to an apex region;
bending said stream in said apex region upon a surface a sufficient amount to form a fiber with one side having a longer length dimension than the opposite side; and
withdrawing said fiber from said apex region.
3. The method recited in claim 2 further including the step of supplying lubricant to reduce friction between said surface and said stream.
4. The method recited in claim 2 where said fiber withdrawn from said apex region is a fine fiber smaller than .0002 inch in diameter.

References Cited

UNITED STATES PATENTS 2,708,813    5/1955    Bourgeaux _____ 65—2
3,063,094    11/1962   Warthen _____ 65—2
3,300,334    1/1967    Gosnell _____ 65—3
3,359,356    12/1967   Mylo _____ 264—18

S. LEON BASHORE, Primary Examiner

R. L. LINDSAY, JR., Assistant Examiner

U.S. Cl. X.R.

18—8; 28—1.5, 72.13; 65—3, 12; 264—168